3,228,779
REFRACTORY PRODUCTS AND METHOD OF MAKING

Roland R. Van Der Beck, Jr., West Chester, Pa., assignor to Foote Mineral Company, Philadelphia, Pa., a corporation of Pennsylvania
No Drawing. Filed Mar. 6, 1962, Ser. No. 177,734
9 Claims. (Cl. 106—65)

This invention relates to a castable refractory having low drying shrinkage and a low coefficient of expansion, and high strength over a wide temperature range. The invention also relates to the preparation of such a castable material and to shaped bodies made from such material in fired as well as unfired form.

Castable refractories are mixtures of refractory grogs, which are normally, but not necessarily always, ceramic materials which have been stabilized by calcining, with a binder. The binder, which may be hydraulic or chemical in nature, provides cold setting properties and forms a bond between the grog particles. Sufficient binder is used to provide the desired physical properties, and a liquid vehicle, usually water, is used to produce the desired plastic state so that the material can be formed into the desired shape by trowelling, pressing, vibrating, extruding, and the like. The grog, as is understood in the art, is an inorganic refractory material, such as an oxide or mixture of oxides like silica and minerals including silica. It is the grog which develops a ceramic bond at firing temperatures, and forms the body of the refractory product.

In castable refractories, a hydraulic cement or a chemical bond is essential to the development of a bond between the grog particles. The binder is, therefore, a critical component of the body. Castables, unlike conventional ceramic formulations which are not expected to develop strength and dimensional stability until they have been fired, are required to achieve a high degree of strength on initial curing, and to maintain a high degree of dimensional stability throughout their useful life when they are subjected to varying degrees of heat. Strength and dimensional stability limit their application, life and maximum use temperature. In practice, castable refractories are usually placed and used without prior heat treatment. It is also convenient at times to form shapes from castables and to prefire them, much as is done with conventional ceramic materials. For many applications this is not possible, however, or it adds greatly to the cost. It would be desirable to eliminate the need for such prefiring, and it is one of the objectives of the present invention to do so.

Since the grog will usually represent 75% or more of the material in a castable refractory, the overall properties of the product are highly dependent on the properties of the grog. Selection of the proper binder, however, is extremely important since the strength of the bond in the unfired state is dependent entirely on the properties of the binder. Although the binders employed for the manufacture of conventional ceramics are ordinarily fugitive and play no role in the final properties of the fired body, the binder in a castable refractory influences the use characteristics of the body to a significant degree because prefiring to promote strength and dimensional stability cannot often be resorted to.

Hydraulic binders which are most commonly employed, inevitably undergo degeneration when the chemically combined water is lost. This occurs gradually above 300° F. when calcium aluminate cements and Portland cements are used, and results in extensive losses in strength. If heating is carried out to elevated temperatures, a ceramic bond will eventually develop with accompanying shrinkage due to interreaction between bond and grog. Strength may also be recovered gradually. Sodium silicate and aluminum phosphate are also employed as binders in castable refractories.

In all such cases, the initial bond must transform at elevated temperatures from a hydraulic or chemical bond to a ceramic bond, with more or less degradation of properties including loss of strength and dimensional stability. This is the reason it is sometimes necessary or desirable to prefire shapes made from these materials prior to use. When prefired to temperatures well above the use temperature, these bodies, like conventional ceramics, become more stable in use at lower temperatures.

The disadvantages of existing castable refractories have not prevented their application in many industrial applications, as they adequately fill many requirements which cannot be easily handled in any other way. However, there are other potential applications for an easily formed, dimensionally stable castable refractory which at least maintains its initial cured strength at increasing temperatures, that have not been satisfied by existing castables because of the loss of strength at elevated temperatures due to degeneration of the binder, or to the loss of dimensional stability of the body due to shrinkage. In addition, many of these applications require extreme thermal shock resistance, also not afforded by most of the available materials. Especially notable among these applications are forming tools for the metallurgical trade, and brazing jigs and fixtures for simultaneously heat treating and joining metals. Other application areas in the ceramic industry are kiln car tops, and monolithic kiln walls and bottoms. The availability of dimensionally stable, strong, and easily fabricated tooling is of keen interest to all companies processing the refractory metals.

The pressure required to form metals decreases with increasing temperatures, ultimately becoming quite low. Therefore it is desirable to form metals at elevated temperatures. But metal molds are not durable at the temperatures required for ready forming. Refractory molds would be. Therefore efforts have been made to develop ceramic molds for forming metals.

To be useful for this purpose, a refractory composition must have good dimensional stability. It must have a very small drying shrinkage when cast and a very small size change if heated to maturing temperatures. The fired body must be dimensionally stable at all operating temperatures between room temperature and about 2000° F. or higher, and furthermore, it must have thermal shock resistance permitting repeated and rapid cooling from elevated temperatures, up to 23000° F., to room temperature or lower. In this connection, it is sometimes desirable to use liquid nitrogen or other low temperature quenching medium to preserve a particular structure in the metal.

To be most economical, it would be desirable that forming tools made from castable refractories not be prefired in order to permit their use in operations where metal is formed under high pressure. However, if the forming pressures are so high as to make prefiring desirable, the castable should develop a high early strength to minimize the duration of the heat treatment.

Where very large shapes are desired to be used simultaneously for heat treating and brazing of refractory metals, as in the aircraft industry, there is application for very large, monolithic refractory castings. Thermal shock resistance and dimensional stability are required in these cases.

It is an object of this invention to provide a novel, improved castable refractory composition.

Still another object is to provide refractory bodies adapted, with or without firing, for use at elevated temperatures.

A further object is to provide castable refractory compositions characterized by low shrinkage, maintenance of strength and dimensional stability during drying and upon being subjected to elevated temperatures.

A particular object of this invention is to provide a castable refractory composition adapted to produce, without prefiring, tools for forming or heat treating metals at elevated temperatures.

Another specific object is to provide a novel method of making an unfired refractory body adapted for use as a tool for forming or heating treating metals at elevated temperatures.

These and other objects will become evident from a consideration of the folowing specification and claims.

It has now been found that a refractory composition comprising, as at least the major constituent, an intimate mixture of particles of a lithium aluminum silicate selected from the group consisting of petalite and beta spodumene as grog and an aqueous sol of colloidal silica as the binder can be formed and dried without any significant shrinkage to provide a shaped body utilizable as such for applications, wherein the body is subjected to high temperatures, without suffering significant dimensional change or loss in strength, and can, if desired, be so heated to temperatures up to about 2300° F. without prefiring. If desired, the body may be fired before use to produce a ceramic product exhibiting high strength and high thermal shock resistance.

The stated composition has many important and unobvious advantages, which illustrate its uniqueness. These are: (1) Ability to be cast into large, monolithic layers or sections which will withstand extreme temperature variations without failure. (2) Development of high strength on drying, and development of consistently increasing strength with increasing temperature. (3) Extreme thermal shock resistance, permitting cycling from 2300° F. to room temperature or below without failure. (4) Development of high early strength on initial heating to ceramic bond-forming temperature, through development of a thermodynamically stable, single phase body.

Referring to the colloidal silica component of the composition employed, this is unique in that there is no detectable loss of strength over the entire temperature range of interest. Specimens of the present composition subjected to modulus of rupture evaluation using three point loading at room temperature, 500° F., 1000° F., 1500° F., 1800° F., 2000° F., and 2200° F., show stable or increasing values of strength. This is an extremely desirable property. On the other hand, with organic binders, the bond commonly deteriorates upon heating. Moreover, the transition from chemical to ceramic bond with the present composition, which probably occurs between about 1500° F. and about 2000° F., results in no significant shrinkage. Dimensional integrity of the present castables is maintained to about 2300° F. Since this is only 300° below the fusion point of pure spodumene, it represents a very desirable and unusual condition. When a lithium aluminum silicate is fired at maturing temperatures in admixture with any of a number of other materials which have been tried, such as talc, clay, or the like, development of the ceramic bond is accompanied by consolidation and coalescence of the mixture and considerable shrinkage.

Thus, the composition of this invention meets the requirements set forth above which are needed to adapt it for use in producing refractory tools for forming and heat treating metals at elevated temperatures. It can be shaped at room temperature and dried to form an unfired body of satisfactory strength. The shrinkage in drying is low. The shaped body can be directly used as such in applications where it will be subjected to high temperatures such as a mold for molten metals or other tool for high-temperature metal-working operations. During such use it will increase in strength as the temperature it reaches increases, and will not suffer any significant shrinkage even at temperatures in the neighborhood of 1500° F., where ceramic bond formation begins, to 2300° F. Because the strength of the unfired material does not decrease upon increase in temperature, it maintains desirable strength characteristics between the "hot face" and the "cold face" when employed as, for example, a mold or a kiln wall. The "green" shaped body can, of course, be fired (sintered) before utilization to provide the full available strength, without exhibiting substantial shrinkage. It has dimensional stability between room temperature and about 2300° F. because of its low thermal coefficient of expansion, and, hence, excellent thermal shock resistance. And it retains these strength and dimensional stability properties, without substantial degradation or change in structure or properties, during cycling between low and elevated temperatures in use.

Referring now to the practice of this invention, the principal grog employed in the castable refractory composition will be a lithium aluminum silicate mineral. More particularly, it will be petalite or beta spodumene, or mixtures of the two. In the ultimate fired body, what will be present in either case is beta spodumene which has an $Li_2O: Al_2O_3: SiO_2$ ratio of 1:1:4. Petalite, in which the $Li_2O: Al_2O_3: SiO_2$ ratio is 1:1:8, changes on heating to form a beta spodumene-silica solid solution. It is found that either alpha or beta petalite can be employed in the practice of this invention. The refractoriness of the lithium aluminum silicate system is not sensitive to compositional changes in the $Li_2O: Al_2O_3: SiO_2$ ratio between 1:1:4 and 1:1:8, and investigations have shown there is no pronounced detrimental effect of silica in solid solution in the lattice. Where spodumene is used as grog, it is desirable to add the raw material in the form of beta spodumene. Naturally-occuring alpha spodumene undergoes a substantial change in density on inverting to beta spodumene during calcination, for which reason it is preferred to calcine it to beta spodumene before employing it in the castable refractory composition.

The lithium aluminum silicate grog will be employed in relatively fine particulate form, and, preferably will be of a particle size distribution to provide proper packing generally according to the packing index. Extreme fineness of particle size enhances smoothness of the surface of castings. Larger particle sizes minimize shrinkage in drying and firing the castings. Thus, it will frequently be advantageous to use a mixture of different particle sizes, as for example a mixture of a fine particle size of the selected lithium aluminum silicate, such as through 200 mesh, with a less fine particle size of it such as through 20 and on 50 mesh. This will give better packing, and eliminate any significant shrinkage. The proportions of fine and coarse mesh particle size in this mixture may vary, depending on the particular particle sizes being used, for example from 90:10 to 10:90. A particularly preferred mix is one containing about 60% through 20 and on 50 mesh, and about 40% through 325 mesh. On the other hand, in applications where slight shrinkage, such as about 1.5%, can be tolerated, the grog need not be a selected mixture of coarse and fine as described but may be substantially entirely through 100 mesh or 200 mesh.

To minimize drying time and to further reduce shrinkage in very large castings, it is desirable to introduce from about 10 to about 50%, by volume based on the total volume of the grog component in the shaped body, of a coarse grog. Such coarse grog may have a particle size more coarse than 20 mesh and up to about ½", or even higher in the case of massive castings. This coarse grog need not be a lithium aluminum silicate, and desirably may be another refractory material, like calcined fire clay. The employment of a substantial amount of a coarse grog like calcined fire clay in large castings is desirable from an economic standpoint, and in such situations the marked thermal shock resistance and strength characteristics of the present composition are retained in large measure, depending upon the degree of dilution by the added coarse grog, and the overall effect is still a substantial improvement over what can be achieved with prior systems.

The binder employed will be an aqueous sol of colloidal silica. Aqueous sols of colloidal silica may be prepared by a variety of well-known procedures. For example, a sodium silicate solution may be treated with an acidic ion exchange resin to reduce the alkali metal content, producing $Na_2O:SiO_2$ ratios of less than about 1:10 as taught in U.S. Patent No. 2,244,325. Preferably this ratio is between about 1:50 and about 1:300. In conformity with the usual definition of colloidal materials, the silica will have a submicron particle size, such as one-tenth of a micron or less. The silica is amorphous and in the form of discrete spheres. It may desirably be treated to enhance the uniformity of the particle size of the silica, as for example by the method of U.S. 2,574,902 and 2,577,485, which are reported to be employed in producing a silica aquasol commercially available under the trademark "Ludox" of E. I. du Pont de Nemours & Co. Other aqueous colloidal silica sols, such as those others which are commercially available, may also be employed. Usually the silica content will be between about 10% and 50% by weight in these sols, the balance being water. Preferred sols are those containing from about 15% to about 30%, by weight, of silica. There are also available various modified forms of colloidal silica sols which are applicable for use in accordance with the present invention. One form, for example, is an alumina-modified colloidal silica sol in which the silica particles are coated with a thin film of alumina. This material has also been found to be particularly suitable for use. The modified colloidal silica sols are included, herein and in the claims, where reference is made to colloidal silica and colloidal silica sol.

The amount of colloidal silica sol in the castable refractory composition associated with the lithium aluminum silicate grog should be at least enough to provide a cohesive and plastic, formable mass. The water in the sol is relied upon to impart the desired consistency to the mix for forming. Good results have been achieved in the practice of the invention using a sufficient amount of an aqueous silica sol to provide from about 2 parts by weight of colloidal silica to about 15 parts by weight, per 100 parts by weight of grog. In general, amounts in excess of about 20 parts by weight colloidal silica per 100 parts by weight of grog will be avoided primarily for economical considerations. The exact amount of silica sol employed will also be adjusted to control the consistency of the mix as required for the particular forming procedure to be employed.

The following Examples I–VII illustrate the insignificant drying and firing shrinkage encountered with the present compositions, as well as the high, fired strength. In these examples, all parts set forth for the constituents are parts by weight.

TABLE I

|  | I | II | III | IV |
|---|---|---|---|---|
| Beta Spodumene: |  |  |  |  |
| Percent −20 mesh | 33 |  | 25 | 25 |
| Percent −200 mesh | 33 | 50 |  | 25 |
| Percent −325 mesh | 34 |  |  | 25 |
| Percent −20, +50 mesh |  |  |  |  |
| Petalite: |  |  |  |  |
| Percent −20 mesh |  |  | 25 | 25 |
| Percent −200 mesh |  | 50 | 25 |  |
| Percent −325 mesh |  |  | 25 |  |
| Colloidal Silica Sol (30% $SiO_2$)[1] | 37 | 47 | 25 | 31 |
| Firing Temp., °F | 2,000 | 2,000 | 2,000 | 2,000 |
| Percent Drying Shrinkage | 0.44 | 0.69 | 0.81 | 0.31 |
| Percent Firing Shrinkage | 0.12 | [2] 0.31 | [2] 0.81 | [2] 0.31 |
| Percent Total Shrinkage | 0.56 | 0.37 | 0 | 0 |
| Modulus of Rupture, #/in.[2] | 1,650 | 1,400 | 1,100 | 1,200 |

[1] Ratio, wt., $SiO_2/Na_2O = 95$.
[2] Actually, expansion to this extent.

TABLE II

|  | V | VI | VII |
|---|---|---|---|
| Beta Spodumene: |  |  |  |
| Percent −20 mesh |  |  |  |
| Percent −200 mesh |  |  |  |
| Percent −325 mesh |  | 43 | 60 |
| Percent −20, 50 mesh |  | 57 | 40 |
| Petalite: |  |  |  |
| Percent −20 mesh |  |  |  |
| Percent −200 mesh | 100 |  |  |
| Percent −325 mesh |  |  |  |
| Colloidal Silica Sol (30% $SiO_2$)[1] | 37 | 28 | 25 |
| Firing Temp., °F | 2,000 | 2,000 | 2,200 |
| Percent Drying Shrinkage |  | 0.15 | 0.20 |
| Percent Firing Shrinkage | [2] 0.79 | 0.22 | 0.32 |
| Percent Total Shrinkage |  | 0.37 | 0.52 |
| Modulus of Rupture, #/in.[2] | 1,500 | 1,200 | 2,000 |

[1] Ratio, wt., $SiO_2/Na_2O = 95$.
[2] Actually, expansion to this extent.

*Example VIII*

A composition made up as in Example VI, is formed into standard bars which are then heated to various temperature levels. On cooling, these bars are subjected to load, and their breaking strength measured. The results show that on heating the green composition from room temperature to and through firing there is a progressive increase in strength without loss of dimensional stability.

| Temperature (°F.) | Tranverse Breaking Strength (# in.²) | Total Percent Shrinkage |
|---|---|---|
| 80 | 500 | 0.38 |
| 1,000 | 500 | 0.47 |
| 1,500 | 600 | 0.37 |
| 2,000 | 1,200 | 0.50 |
| 2,200 | 2,000 | 0.70 |

*Example IX*

This example illustrates the present composition in which a coarse grog is included. Twenty-eight and one-half parts, by weight, of coarse calcined fire clay (approximately ¼" in size) are premoistened with water to saturation. It is then thoroughly mixed with 38.2 parts of beta spodumene (through 20 mesh—on 50 mesh) and 28.6 parts of beta spodumene (through 325 mesh). Colloidal silica sol (30% $SiO_2$) is then added as required to form a plastic mass (15.7 parts), and the resulting mass is formed into bars. The shrinkage on drying is only 0.30% and, on firing at 2200° F., only 0.14, giving a total shrinkage of only 0.44%.

Considerable modification is possible in the selection of the constituents and in the proportions thereof without departing from the scope of the invention.

I claim:

1. A castable refractory composition having a high dimensional stability consisting essentially of a plastic mixture of grog and binder wherein the grog contains at least a major portion of a mixture of particles of at least one lithium aluminum silicate selected from the group consisting of petalite and beta spodumene in which from 90% to 10% by weight are of fine particles through 200 mesh and in which from 10% to 90% by weight are of coarse particles through 20 and on 50 mesh, said binder being an aqueous sol of colloidal silica having a concentration of colloidal silica between about 10 and about 50% by weight and the proportion of aqueous sol of colloidal silica to grog providing between about 2 and about 20 parts by weight of colloidal silica per 100 parts by weight of grog.

2. The composition of claim 1 wherein said lithium aluminum silicate is beta spodumene, wherein about 40% by weight of the beta spodumene has a particle size through 325 mesh and wherein about 60% by weight of the beta spodumene has a particle size through 20 and on 50 mesh.

3. The composition of claim 1 wherein the lithium aluminum silicate is beta spodumene; wherein the concentration of colloidal silica in the aqueous sol is between about 15 and about 30%, and wherein the proportion of aqueous sol of colloidal silica provides between about 2 and about 15 parts of colloidal silica per 100 parts of grog.

4. A castable refractory composition having a high dimensional stability consisting essentially of a plastic mixture of grog and binder wherein the major portion of the grog, from about 50 to about 90% by volume, is a mixture of particles of at least one lithium aluminum silicate selected from the group consisting of petalite and beta spodumene in which from 90% to 10% by weight are of fine particles through 200 mesh and in which from 10% to 90% by weight are of coarse particles through 20 and on 50 mesh, and wherein a minor portion of the grog, from about 10 to about 50% by volume, is calcined fire clay having a particle size greater than 20 mesh, said binder being an aqueous sol of colloidal silica having a concentration of colloidal silica between about 10 and about 50% by weight and the proportion of aqueous sol of colloidal silica to grog providing between about 2 and about 20 parts by weight of colloidal silica per 100 parts by weight of grog.

5. The composition of claim 4 wherein said lithium aluminum silicate is beta spodumene.

6. The composition of claim 5 wherein the concentration of colloidal silica in the aqueous sol is between about 15 and about 30%, and wherein the proportion of aqueous sol of colloidal silica provides between about 2 and about 15 parts of colloidal silica per 100 parts of grog.

7. The method of making a refractory body having a high dimensional stability comprising combining:
(a) a grog wherein at least a major portion thereof is a mixture of particles of at least one lithium aluminum silicate selected from the group consisting of petalite and beta spodumene in which from 90% to 10%, by weight, are of fine particles through 200 mesh and in which from 10% to 90% by weight are of coarse particles through 20 and on 50 mesh, and
(b) an aqueous sol of colloidal silica wherein the concentration of colloidal silica is between about 10 and about 50% by weight, the proportion of aqueous sol of colloidal silica to grog providing between about 2 and about 20 parts by weight of colloidal silica per 100 parts by weight of grog, shaping the mass and drying the shaped mass.

8. A cast, dry green refractory body consisting essentially of a mixture of grog and binder, wherein the grog contains at least a major portion of a mixture of particles of at least one lithium aluminum silicate selected from the group consisting of petalite and beta spodumene in which from 90% to 10% by weight are of fine particles through 200 mesh and in which from 10% to 90% by weight are of coarse particles through 20 and on 50 mesh, said binder being colloidal silica particles, deposited in said mixture upon removal of water from an aqueous sol of colloidal silica, in an amount between about 2 and about 20 parts by weight per 100 parts by weight of grog.

9. The refractory body of claim 8 wherein the colloidal silica is present in an amount between about 2 and about 15 parts by weight per 100 parts by weight of grog.

References Cited by the Examiner
UNITED STATES PATENTS

Re. 24,795  3/1960  Hummel _____ 106—65
2,942,991  6/1960  Smith _____ 106—65
3,096,159  7/1963  Van Cott _____ 106—65

TOBIAS E. LEVOW, *Primary Examiner.*

JOHN H. MACK, *Examiner.*

UNITED STATES PATENT OFFICE
CERTIFICATE OF CORRECTION

Patent No. 3,228,779                                January 11, 1966

Roland R. Van Der Beck, Jr.

It is hereby certified that error appears in the above numbered patent requiring correction and that the said Letters Patent should read as corrected below.

Column 2, line 59, for "23000° F." read -- 2300° F. --.

Signed and sealed this 27th day of December 1966.

(SEAL)
Attest:

ERNEST W. SWIDER                              EDWARD J. BRENNER
Attesting Officer                                   Commissioner of Patents